(12) United States Patent
Willars et al.

(10) Patent No.: US 6,889,050 B1
(45) Date of Patent: May 3, 2005

(54) VARIABLE TRANSMISSION RATE SERVICES IN A RADIO ACCESS NETWORK

(75) Inventors: Per Willars, Stockholm (SE); Göran Rune, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 689 days.

(21) Appl. No.: 09/717,386

(22) Filed: Nov. 22, 2000

(51) Int. Cl.[7] ............................................... H04Q 7/20
(52) U.S. Cl. ..................... 455/452.2; 455/432.1; 455/436; 455/453; 370/329; 370/331; 370/395.21
(58) Field of Search ............................. 455/422, 432.1, 455/436, 442, 450, 453, 510, 517; 370/310.2, 320, 329, 331, 395.21

(56) References Cited

U.S. PATENT DOCUMENTS

| | | | | |
|---|---|---|---|---|
| 6,131,030 A | * | 10/2000 | Schon et al. | 455/438 |
| 6,212,380 B1 | * | 4/2001 | Laatu | 455/436 |
| 6,374,112 B1 | * | 4/2002 | Widegren et al. | 455/452.2 |
| 6,473,442 B1 | * | 10/2002 | Lundsjo et al. | 370/537 |
| 6,529,490 B1 | * | 3/2003 | Oh et al. | 370/331 |

FOREIGN PATENT DOCUMENTS

| | | | | |
|---|---|---|---|---|
| FI | WO95/08897 | * | 3/1995 | H04Q/7/38 |
| FI | WO99/41850 | * | 8/1999 | H04B/7/005 |
| US | EP0740486 | * | 4/1996 | H04Q/7/38 |
| WO | 99/41850 A | | 8/1999 | |
| WO | WO00033601 | * | 6/2000 | H04Q/11/00 |
| WO | 00/44191 A | | 7/2000 | |

OTHER PUBLICATIONS

Technical Specification 3GTS 25,302 v3.4.0 "3rd generation partnership project: technical specification group radio access network; services provided by the Physical Layer", (Release 1999), Mar. 2000.*

*Technical Specification* 3G TS 25.302 v.3.4.0, 3rd Generation Parnership Project; Technical Specification Group Radio Access Netowrk; Services provided by the Physical Layer (Release 1999), Mar. 2000.

* cited by examiner

*Primary Examiner*—William Trost
*Assistant Examiner*—Stephen D'Agosta
(74) *Attorney, Agent, or Firm*—Nixon & Vanderhye P.C.

(57) ABSTRACT

A connection is supported in a radio access network (RAN) between an external network to a UE using a first RAN node and second RAN node. The transmission rate from the first RAN node to the second RAN node is regulated based on a rate control request from the second RAN node. In one example embodiment, the first and second RAN nodes correspond to a serving radio network controller and a drift radio network controller, respectively. In another example embodiment, the first and second RAN nodes correspond to a radio network controller and radio base station, respectively. The rate control request is made based upon a congestion or load condition being monitored by the second RAN node. When the load condition is detected, the second RAN node requests the first RAN node to lower the transmission rate of information. Conversely, when the load condition is relieved, the second RAN node can request that the first RAN node increase the transmission rate of information. The rate control may be applied in both downlink and uplink directions.

36 Claims, 6 Drawing Sheets

VARIABLE TRANSMISSION RATE SERVICES IN A RADIO ACCESS NETWORK

FIELD OF THE INVENTION

The present invention relates to telecommunications, and particularly, to handling variable transmission rate services in a radio access network.

BACKGROUND AND SUMMARY

In a typical cellular radio system, "wireless" user equipment units (UEs) and one or more "core" networks (like the public telephone network or Internet) communicate via a radio access network (RAN). The UEs very often are mobile, e.g., cellular telephones and laptops with mobile radio communication capabilities (mobile terminals). UEs and the core networks communicate both voice and data information via the radio access network.

The radio access network services a geographical area which is divided into cell areas, with each cell area being served by a base station (BS). Thus, a base station can serve one or multiple cells. A cell is a geographical area where radio coverage is provided by the radio base station equipment at a base station site. Each cell is identified by a unique identity, which is broadcast in the cell. Base stations communicate over a radio or "air" interface with the user equipment units. In the radio access network, one or more base stations are typically connected (e.g., by landlines or microwave links) to a radio network controller (RNC). The radio network controller, also sometimes termed a base station controller (BSC), supervises and coordinates various activities of its base stations. In turn, the radio network controllers are typically coupled together and coupled to one or more core network service nodes which interface with one or more core networks.

One example of a radio access network is the Universal Mobile Telecommunications System (UMTS) Terrestrial Radio Access Network (UTRAN). The UTRAN is a third generation system which in some respects builds upon the radio access technology known as Global System for Mobile communications (GSM) developed in Europe. UTRAN is a wideband code division multiple access (W-CDMA) system.

In W-CDMA technology, a common frequency band allows simultaneous communication between a user equipment unit and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units. Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit need not switch frequency when handoff of a connection is made from one cell to another. As a result, a destination cell can support a connection to a user equipment unit at the same time the origination cell continues to service the connection. Since the user equipment is always communicating through at least one cell during handover, there is no disruption to the call. Hence, the term "soft handover." In contrast to hard handover, soft handover is a "make-before-break" switching operation.

The UTRAN accommodates both circuit-switched and packet-switched connections. Circuit-switched connections involve a radio network controller communicating with a mobile switching center (MSC) node which in turn is connected to a connection-oriented, external core network like the Public Switched Telephone Network (PSTN) and/or the Integrated Services Digital Network (ISDN). Packet-switched connections involve the radio network controller communicating with a Serving GPRS Support Node (SGSN), which in turn is connected through a backbone network and a Gateway GPRS support node (GGSN) to packet-switched core networks like the Internet and X.25 external networks. There are several interfaces of interest in the UTRAN. The interface between the radio network controllers and the core network(s) is termed the "Iu" interface. The interface between two radio network controllers is termed the "Iur" interface. The interface between a radio network controller and its base stations is termed the "Iub" interface. The interface between the user equipment unit and the base stations is known as the "air interface" or the "radio interface."

A goal of the Third Generation Partnership Project (3GPP) is to evolve further the UTRAN and GSM-based radio access network technologies. Of particular interest here is the support of variable transmission rate services in the third generation mobile radio communications system for both real time and non-real time services. Of course, since all users share the same radio resources, the radio access network must carefully allocate resources to individual UE connections based on quality of service requirements, such as variable rate services, and on the availability of radio resources. When a core network desires to communicate with a UE, it requests services over the Iu interface from the radio access network in the form of radio access bearers (RABs) with a particular quality of service (QoS). Quality of service includes such things as data rates, speed, variability of data rate, amount and variability of delay, guaranteed versus best effort delivery, error rate, etc. A radio access bearer is a logical channel or connection through the UTRAN and over the radio interface corresponding to a single data stream. For example, one bearer carries a speech connection, another bearer carries a video connection, and a third bearer carries a packet data connection. Connections are mapped by the UTRAN onto physical transport channels. By providing radio access bearer services to the core network, the UTRAN isolates the core network from the details of radio resource handling, radio channel allocations, and radio control, e.g., soft handover.

For simplicity, the term "connection" is used hereafter.

Between the UE and the UTRAN, a connection may be mapped to one or more dedicated transport channels (DCHs) or to a common transport channel such as the random access common channel (RACH), the forward access common channel (FACH), the common packet channel (CPCH), and the downlink shared channel (DSCH). Real time connections are mapped to dedicated channels. On a dedicated channel, resources may be guaranteed to provide a particular service, such as a minimum transmission rate.

Over the Iu interface, a rate control command to the core network user of the connection can be used to at the allowed transmission rate down to a minimum guaranteed rate. Based on this minimum guaranteed rate an the core network rate control mechanism, when the UTRAN performs admission control for a newly-requested connections, it only needs to reserve radio bandwidth and other resources for the minimum guaranteed transmission rate. However, if additional radio resources are or become available, the transmission rate of that connection can be increased from the minimum guaranteed rate.

In contrast to real time connections, non-real time connections may be mapped either to dedicated channels or common channels. Typically, non-real time connections are mapped to dedicated channels when a large volume of data is to be transmit ed. Conversely, non-real time connections are typically mapped to common channels when the data activity level is lower. Since the UTRAN has no guarantees regarding a minimum rate that it must fulfill, the UTRAN may adapt the transmission rate of non-real time connections continuously to the available radio bandwidth without having to signal such a change back to the core network user over the Iu interface.

If during the lifetime of the connection, the UE moves to a cell controlled by another RNC, (referred to as a drift RNC (DRNC)), then the RNC that was initially set up to handle the connection for the UE, (referred to as the serving RNC(SRNC)), must request radio resources for the connection from the drift RNC over the Iur interface. If that request is granted, a transmission path is established for the connection between the SRNC and the DRNC to the UE through a base station controlled by the DRNC.

If the connection is mapped to a common transport channel, the drift RNC allocates the UE connection to a specific common transport channel, e.g., the FACH. Accordingly, information for the UE is transmitted on the established connection over the Iur interface from the serving RNC to the drift RNC. The drift RNC then schedules transmission on the common channel to the UE, taking to account the amount of data to be transmitted on this common channel to other UEs as well. For example, the drift RNC may use a "credit-based" data packet flow control protocol over the Iur interface to limit the amount of data that needs to be buffered in the drift RNC. Thus, the drift RNC, which performs admission control in the cell in which the UE is currently located, also controls the data transmission rate or throughput in that cell. However, the drift RNC does not give the serving RNC any guarantees on the transmission rate/throughput for a connection mapped to a common transport channel.

The situation is different for a dedicated transport channel. When establishing a radio link in a cell controlled by the drift RNC, the drift RNC reserves resources for the dedicated transport channel for this UE. But data transmission on the dedicated transport channel is scheduled by the serving RNC. For real time connections, the serving RNC typically forwards data to the drift RNC at the same transmission rate the data is received from the core network. For non-real time connections, the serving RNC typically transmits the data received from the core network user at the maximum possible transmission rate of the dedicated transport channel until the serving RNC transmission buffers are empty. After a time out period, the dedicated channel is released. Accordingly, the drift RNC must reserve radio resources for the maximum dedicated channel rate when performing admission control for the connection. The maximum channel rate must be reserved even if the average transmission rate over the dedicated channel will ultimately be much lower than that maximum rate.

As a result, there are inefficiencies in allocating dedicated channel resources over the Iur interface. Because the drift RNC must reserve resources for the maximum possible rate of the dedicated channel, some of the reserved radio bandwidth is not used because the serving RNC is not transmitting at the maximum rate. Precious bandwidth is wasted. It is a primary object of the present invention to avoid this inefficiency and thereby increase the capacity of the radio access network.

One possible approach to solving this problem would be for the serving RNC to provide the drift RNC with an average bit rate parameter or requirement. Unfortunately, it is difficult to define average bit rate. Moreover, for the average bit rate parameter to be useful for admission control/resource allocation in the drift RNC, the average bit rate must be determined using an accurate statistical model for the traffic distribution. Such a model is complicated and difficult to provide. A less complicated approach is needed.

A better solution is to have the drift RNC play a part in controlling the connection transmission rate by introducing a feedback type of control signal from the drift RNC through the serving RNC. Assume a connection has been established between an external network to a UE via a first RAN node and second RAN node. The transmission rate from the first RAN node to the second RAN node is regulated based on a rate control request from the second RAN node. In one example embodiment, the first and second RAN nodes correspond to a serving radio network controller and a drift radio network controller, respectively. In another example embodiment, the first and second RAN nodes correspond to a radio network controller and radio base station, respectively.

The rate control request is made based upon a congestion or load condition being monitored by the second RAN node. When the load condition is detected, the second RAN node requests the first RAN node to lower the transmission rate of information. Conversely, when the load condition is relieved, the second RAN node can request that the first RAN node increase the maximum allowed transmission rate of information. The rate control can be applied in the uplink and/or downlink directions.

In one non-limiting, example embodiment where the first and second RAN nodes are the serving and drift RNCs, a connection requested with the UE is established initially by way of a serving RNC through a serving RNC base station to the UE. When the UE moves into a cell area served by another drift RNC, the connection is maintained by way of that drift RNC and a corresponding drift RNC base station. The drift RNC monitors a condition in that cell and based on that condition, (e.g., congested, overloaded, etc.), the drift RNC requests that the serving RNC change the bit rate that the serving RNC is allowed to use, (e.g., decrease the bit rate). Accordingly, the serving RNC changes the bit rate for the connection in response to that request. Subsequently, if the drift RNC detects a change condition in the cell, (e.g., no longer congested), the drift RNC can request the serving RNC to increase the maximum allowed bit rate.

In another non-limiting example embodiment where the first and second RAN nodes are an RNC and a base station, the base station monitors a condition in that cell, and based on that condition, (e.g., congested, overloaded, etc.), the base station requests that the RNC change the bit rate that the RNC is allowed to use, (e.g., decrease the bit rate). Accordingly, the RNC changes the bit rate for the connection in response to that request. Subsequently, if the base station detects a change condition in the cell, (e.g., no longer congested), the base station can request the RNC to increase the maximum allowed bit rate.

Oftentimes, when a connection is initially established, a guaranteed minimum bit rate is specified for the connection. Accordingly, the DRNC and/or base station must ensure that there are sufficient resources to provide that guaranteed bit rate. Moreover, the drift RNC and/or base station cannot in that case request that a bit rate be used that is lower than the guaranteed bit rate.

In a UTRAN specific, example embodiment, the serving RNC sends a set of transport formats to be supported by the drift RNC for the connection. The set of transport formats includes a minimum bit rate and multiple higher bit rates that may be employed if sufficient bandwidth capacity is available. One way of lowering the bit rate is for the drift RNC request to the serving RNC to limit or employ a subset of the allowed transport formats that can be used by the serving RNC to transmit data over the transport channel.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the present invention is described in the context of rate control between particular nodes in the RAN, e.g., a serving RNC and a drift RNC, the present invention may be employed for rate control between any nodes in a radio access network in either or both uplink and downlink directions.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
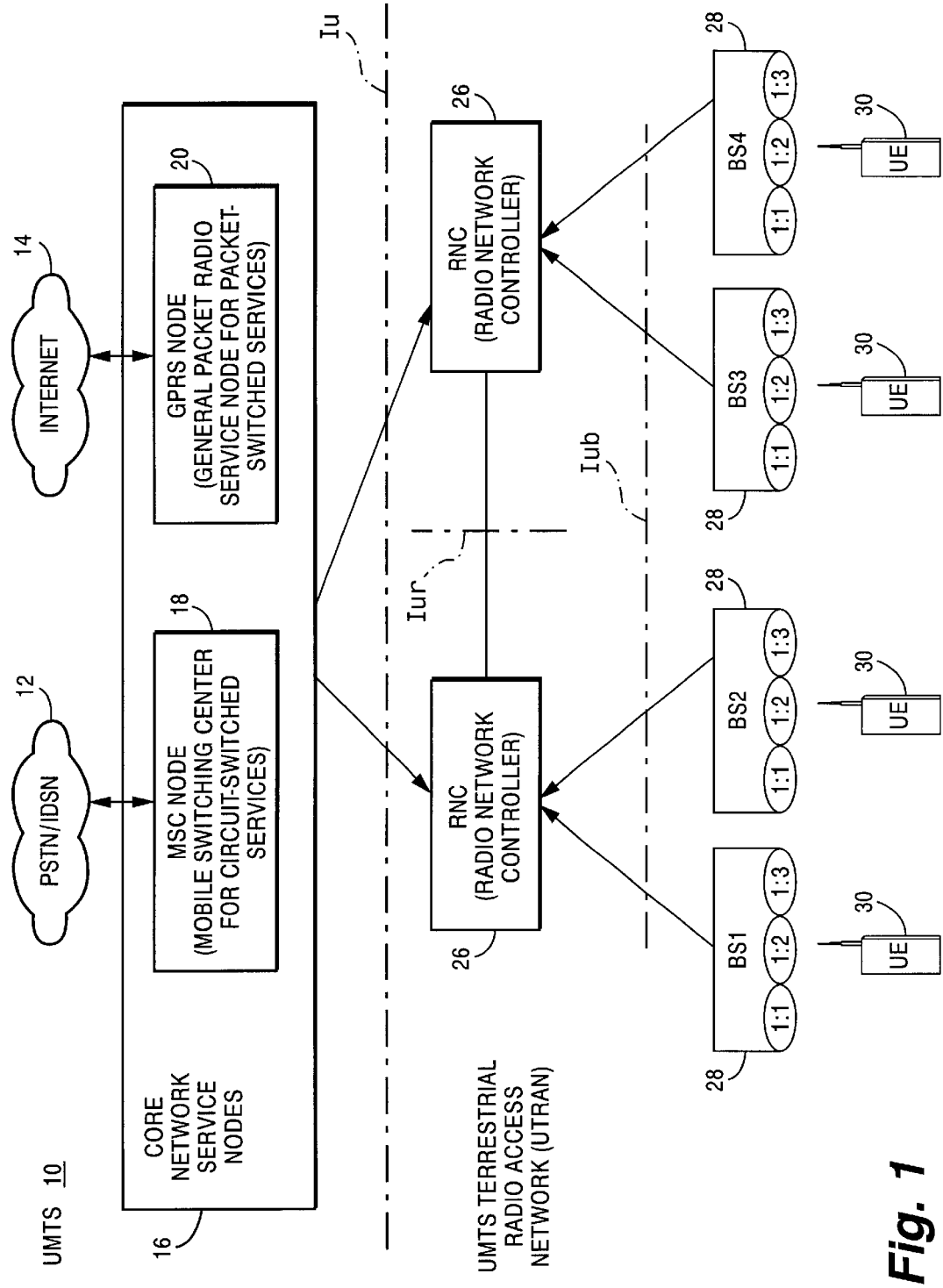
FIG. 1 is a function block diagram illustrating an example mobile radio communications system in which the present invention may be employed.

The present invention is described in the non-limiting, example context of a Universal Mobile Telecommunications System (UMTS) 10 shown in FIG. 1. A representative, connection-oriented, external core network, shown as a cloud 12 may be, for example, the Public Switched Telephone Network (PSTN) and/or the Integrated Services Digital Network (ISDN). A representative, connectionless-oriented external core network shown as a cloud 14, may be for example the Internet. Both core networks are coupled to corresponding core network service nodes 16. The PSTN/ISDN network 12 is connected to a connection-oriented service node shown as a Mobile Switching Center (MSC) node 1 that provides circuit-switched services. The Internet network 14 is connected to a General Packet Radio Service (GPRS) node 20 tailored to provide packet-switched type services which is sometimes referred to as the serving GPRS service node (SGSN).

Each of the core network service nodes 18 and 20 communicate with a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes. Each RNC 26 communicates with a plurality of base stations (BS) 28 BS1–BS4 over the Iub interface. For example, and again for sake of simplicity, two base station nodes are shown connected to each RNC 26. It will be appreciated that a different number of base stations can be served by each RNC, and that RNCs need not serve the same number of base stations. Moreover, FIG. 1 shows that an RNC can be communicated over an Iur interface to one or more RNCs in the UTRAN 24. A user equipment unit (UE), such as a user equipment unit (UE) 30 shown in FIG. 1, communicates with one or more base stations (BS) 28 over a radio or air interface 32. Each of the radio interface 32, the Iu interface, the Iub interface, and the Iur interface are shown by dash-dotted lines in FIG. 1.

Preferably, radio access is based upon Wideband Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment as well as for the user equipment to identify transmissions from the base station intended for that user equipment from all of the other transmissions and noise present in the same area.

Different types of control channels may exist between one of the base stations 28 and user equipment units 30. For example, in the forward or downlink direction, there are several types of broadcast channels including a general broadcast channel (CH), a paging channel (PCH), a common pilot channel (CPICH), and a forward access channel (FACH) for providing various other types of control messages to user equipment units. In the reverse or uplink direction, a random access channel (RACH) is employed by user equipment units whenever access is desired to perform location registration, call origination, page response, and other types of access operations. The random access channel (RACH) and forward access channel RACH) are also used for carrying certain user data, e.g., small amounts of best effort packet data. In both directions, dedicated transport channels (DCH) may be allocated to carry real time traffic or substantive amount of non-real time data traffic for a specific user equipment (UE) unit. The present invention is particularly concerned with dedicated transport channels that carry traffic to the UE rather than common or shared transport channels.

With respect to a certain RAN-UE connection, an RNC can have the role of a serving RNC(SRNC) or the role of a drift RNC (DRNC). If an RNC is a serving RNC, the RNC is in charge of the connection with the user equipment unit and has full control of the connection within the radio access network (RAN). A serving RNC interfaces with the core network for the connection. On the other hand, if an RNC is a drift RNC, it supports the serving RNC by supplying radio resources (within the cells controlled by the drift RNC) needed for a connection with the user equipment.

When a connection between the radio access network and user equipment is being established, the RNC that controls the cell where the user equipment (UE) is located when the connection is established is the serving RNC. As the user equipment moves, the connection is maintained by establishing radio communication branches or legs, often called "radio links", via new cells which may be controlled by other RNCs. Those other RNCs become drift RNCs for the connection.

Figure 2:
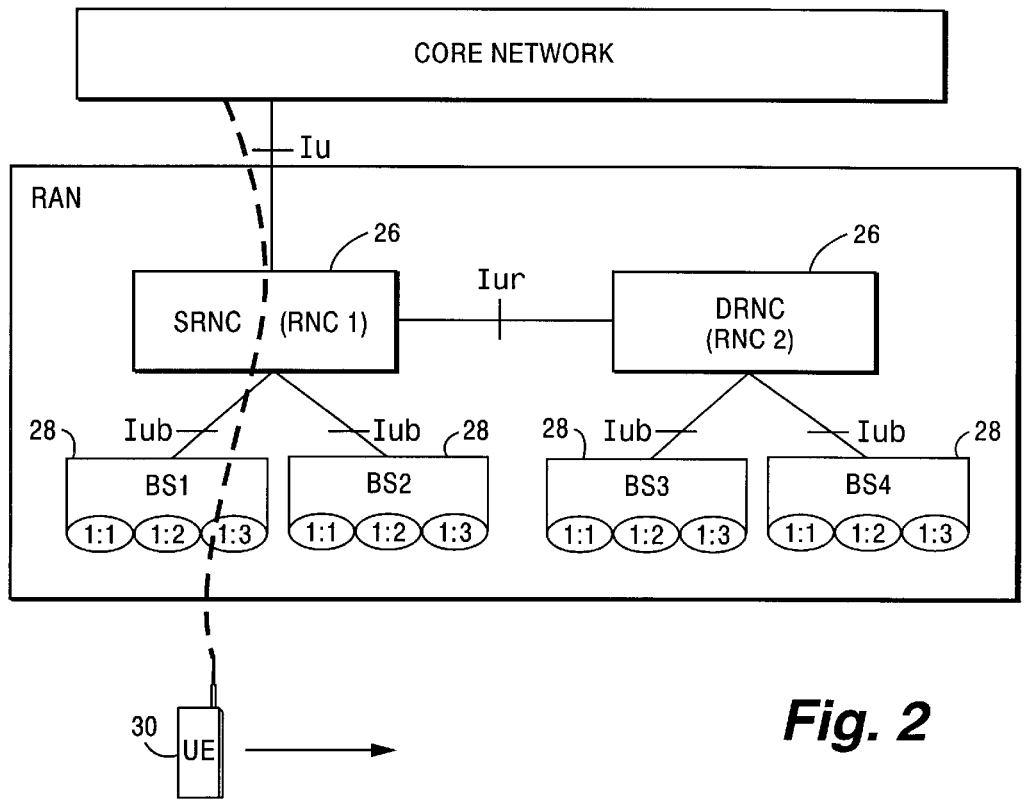
FIG. 2 illustrates establishing a connection from a core network to a user equipment unit though a serving RNC.

To illustrate the foregoing, and as a prelude to an explanation of the present invention, reference is made to the situation shown in FIG. 2. FIG. 2 shows an example of RNC role assignment for user equipment 30 at initial setup of a connection involving user equipment 30. In FIG. 2, radio network controller RNC1 26 acts as the serving RNC for the connection with user equipment 30, located in cell 3 controlled by base station BS1. The connection with user equipment 30 in FIG. 2 is shown by a broken line which extends from core network 16, through radio network controller RNC1, base station BS1, and a BS 1's cell 3 to user equipment 30.

Figure 3:
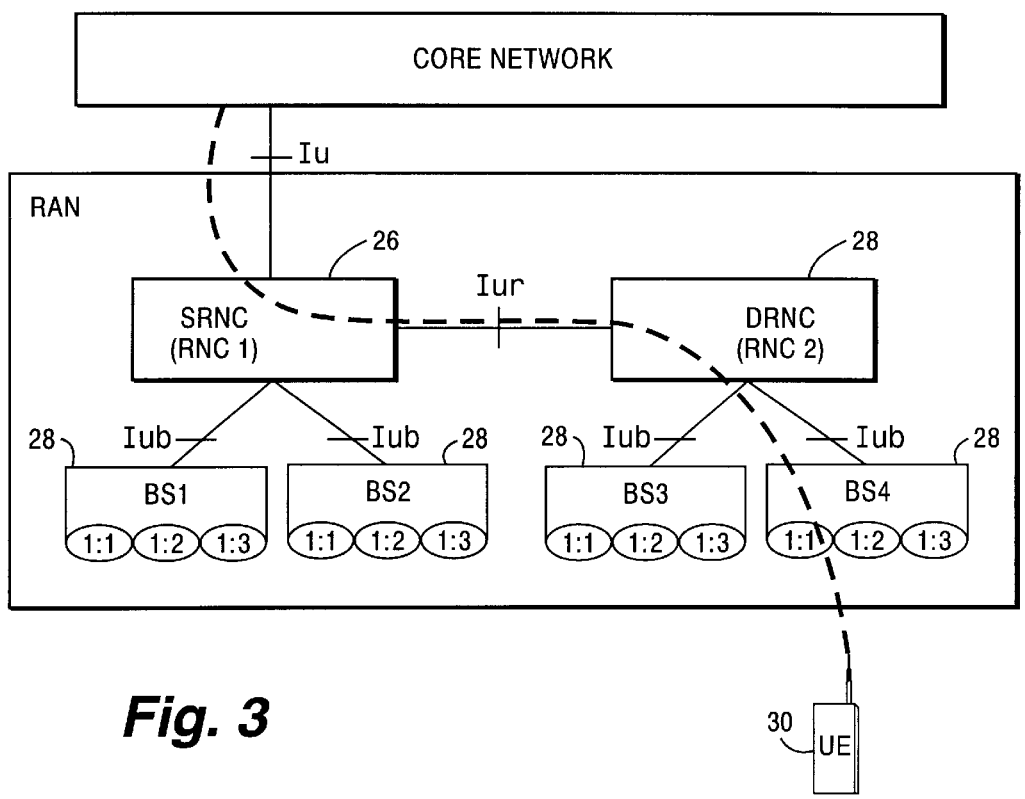
FIG. 3 illustrates a situation where, because of movement of the user equipment, the connection is supported by both a serving RNC and a drift RNC.

Suppose that user equipment 30 travels to the right as indicated by an arrow in FIG. 2, eventually leaving the cell 3 controlled by base station BS1 and traveling successively through the cells controlled by respective base stations BS2 and BS3. As user equipment unit 30 enters a new cell, a handover occurs. FIG. 3 shows user equipment 30 arriving at the cell 1 controlled by base station BS4. Radio network controller 1 still acts as the serving RNC for the connection to user equipment 30, and radio network controller RNC2 acts as the drift RNC. In other words, serving RNC1 controls the connection with user equipment 30, while drift RNC2 supplies resources for the connection with respect to cell 1. The connection is again shown by the broken line.

As described above, when a UE moves to cells controlled by a drift RNC, the serving RNC needs to request resources for this UE from the drift RNC over the Iur interface. The drift RNC allocates certain types of resources for the cell in question such as interference and power resources. The drift RNC also requests the appropriate radio base station to allocate resources internal to the base station needed to support the connection.

For real time connections supported by dedicated transport channels, the serving RNC typically transmits the data to the drift RNC at the rate at which that data is provided from the core network. For non-real time connections supported by dedicated transport channels, the serving RNC typically transmits at the maximum possible rate of the dedicated transport channel. As a result, the drift RNC typically must reserve resources for the maximum dedicated transport channel rate, even if the average rate will be much lower. However, the present invention allows the drift RNC (or any other downstream node in the radio access network) to control the actual transmission rate over the dedicated transport channel. That control is effected by way of a rate control feedback signal to the upstream node, in this case the serving RNC.

Figure 4:
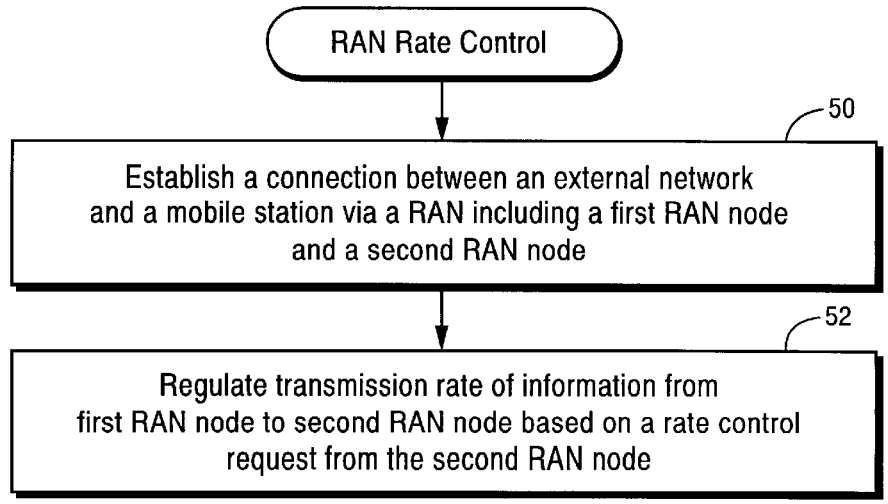
FIGS. 4 and 5 are flowchart diagrams illustrating basic rate control procedures in a radio access network (RAN) in accordance with a general embodiment of the present invention.
Figure 5:
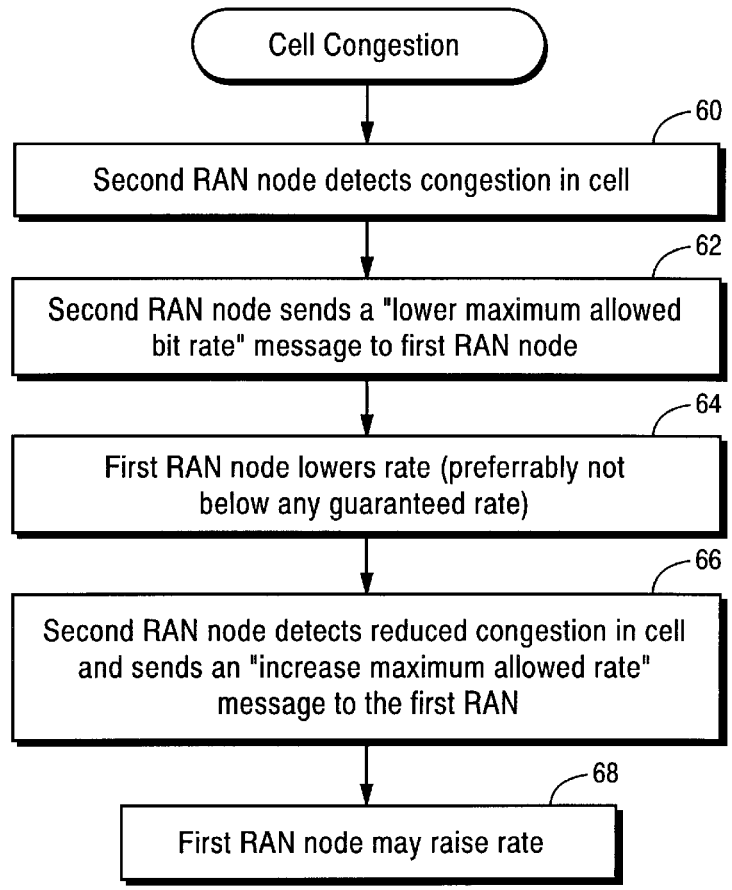

FIGS. 4 and 5 illustrate, in flowchart diagram format, general procedures for implementing the rate control in the radio access network in accordance with a general embodiment of the present invention. Starting at FIG. 4, a connection between an external network and a mobile station is supported by the RAN using a first RAN node and a second RAN node (block 50). The first and second RAN nodes may be for example a serving RNC and a drift RNC, respectively. Alternatively, the first and second RAN nodes may be an RNC and a radio base station, respectively. The transmission rate of information from the first RAN node to the second RAN node is regulated based on a rate control request or other signal from the second RAN node (block 50).

Although the present invention applies primarily to the downlink direction, it may also be employed in the uplink direction. In the uplink case, the second RAN node reserves resources and performs admission control for the minimum guaranteed bit rate for the uplink. If there is congestion on the uplink, e.g., a high interference level, the second RAN node sends a rate control command to the first RAN node to limit the uplink rate below a given maximum allowed value. If the first RAN node is a drift RNC, for example, it acts as a second RAN node towards the serving RNC and forwards this rate limitation to the serving RNC. The serving RNC responds to the rate control command by ordering the UE to limit its uplink rate. This could be done, for example, using the Transport Format Combination Control procedure specified by 3GPP.

Typically, the second RAN node does not need to regulate the transmission rate of information from the first RAN node unless some condition in the RAN or in the cell in which the mobile is currently located requires a rate control action. One example condition is when that cell is congested as outlined in the cell congestion routine shown in flowchart format in FIG. 5. The second RAN node detects that there is congestion in the cell in which the mobile is currently located, e.g., from signals received from the radio base station corresponding to that cell (block 60). The second RAN node sends a "lower maximum allowed transmission rate" type of message to the first RAN node in response to the detected congestion (block 62). In response to that message, the first RAN node lowers the transmission rate to the second RAN node, but preferably that rate is not lowered below any rate that was guaranteed when the connection was established (block 64). After some time period, the second RAN node may detect reduced congestion in the cell prompting it to send a "raise maximum allowed transmission rate" message to the first RAN node (block 66). In response to that message, the first RAN node may raise the rate, preferably not above any predetermined maximum rate (block 68).

By regulating the rate at which data is transmitted through the RAN based upon a congestion or loading condition in the RAN or in the cell in which the UE is located, the second RAN node need not reserve resources for a maximum possible transmission rate. As a result, those resources including both radio resources and signal processing resources are more efficiently utilized which results in increased capacity for the RAN. In addition, if conditions free up resources, then the second RAN node can indicate that higher transmission rates may be used.

A more detailed example embodiment of the present invention as applied to a serving RNC and a drift RNC (FIG.

7) and an RNC and a base station (FIG. 8) will be described below. When the core network indicates to the RAN that a connection is to be established with a mobile, a connection is established between the core network, a serving RNC, a base station, and the user equipment. For a dedicated transport channel, the resources for that connection are dedicated to that connection. Each dedicated channel may have an associated transport format set (TFS) which includes several different transmission rates available on this dedicated transport channel. For example, the TFS might include zero bits per 10 millisecond interval, ten bits per 10 millisecond interval, a hundred bits per 10 millisecond interval, and two hundred bits per 10 millisecond interval as possible transmission rates. Typically, when the connection is being established, the core network requests a particular quality of service. Based on that quality of service, the serving RNC decides how to map the connection onto a dedicated transport channel using one of the available bit rates in the transport format set. For speech information, the CODEC in the core network provides one of multiple bit rates for the speech depending upon the radio channel quality. The SRNC typically agrees to provide the core network a minimum guaranteed bit rate (selected from the TFS) for this particular connection to the UE.

Figure 6:
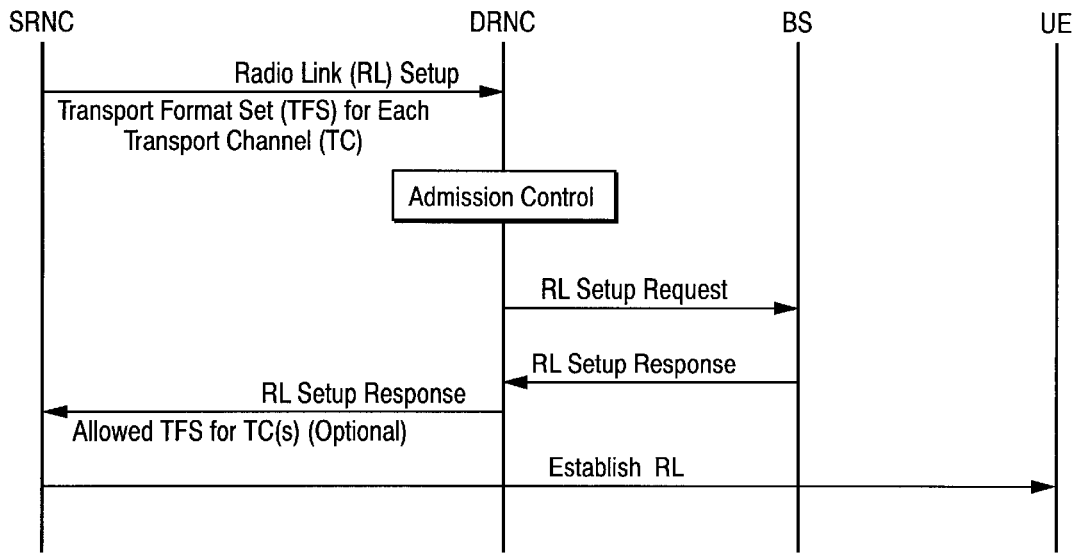
FIGS. 6 and 7 illustrates signaling phase and rate control phase flow diagrams for an example application of the present invention to rate control between a serving RNC and a drift RNC.

Assuming that the UE moves to a different cell served by a different RNC, (see the example in FIG. 3), the connection must now be established with the UE by way of a drift RNC and the associated drift RNC radio base station. To accomplish that process, a signaling phase is performed as illustrated in FIG. 6. The SRNC sends a radio link (RL) setup request message to the drift RNC. That message provides the drift RNC with the transport format set (TFS) for each transport channel (TC) associated with the UE connection. The transport format set contains different available bit rates, one of which is the guaranteed bit rate.

The drift RNC then performs admission control operations in order to establish and support that connection to the UE. For example, the drift RNC allocates specific radio resources, (e.g., spreading codes), as well as data and signaling processing resources to be able to support the guaranteed bit rate. However, resources are not reserved for the higher bit rates permitted in the transport format set. The drift RNC sends a radio link setup request to the radio base station which performs admission control and reserves radio base station internal resources to support the guaranteed bit rate, and thereafter, returns a radio link setup response to the drift RNC. The drift RNC returns a radio link setup response to the serving RNC. The serving RNC then establishes a radio link with the UE.

In one example embodiment of the invention, the serving RNC assumes that all established transport formats are allowed after a successful radio link establishment to a new drift RNC, i.e., at the reception of a radio link setup response message. In other words, there initially is no rate limitation from the drift RNC. Alternatively, the serving RNC assumes that only the transport formats up to the minimum guaranteed bit rate are allowed for a successful radio link establishment to a new drift RNC. In another alternative, the drift RNC includes the initially allowed transport formats in the radio link setup response message to the serving RNC.

Thus, the admission control performed by the drift RNC does not reserve resources for the maximum bit rate permitted by the transport format set; resources are reserved only for the minimum guaranteed bit rate. This does not mean that data may only be transported via the drift RNC at the minimum guaranteed bit rate. Rather, the drift RNC may permit a higher bit rate in the TFS if sufficient resources are available to support that higher rate. The invention therefore offers the drift RNC or radio base station the flexibility to lower the rate, if necessary, but not below the guaranteed rate.

Figure 7:
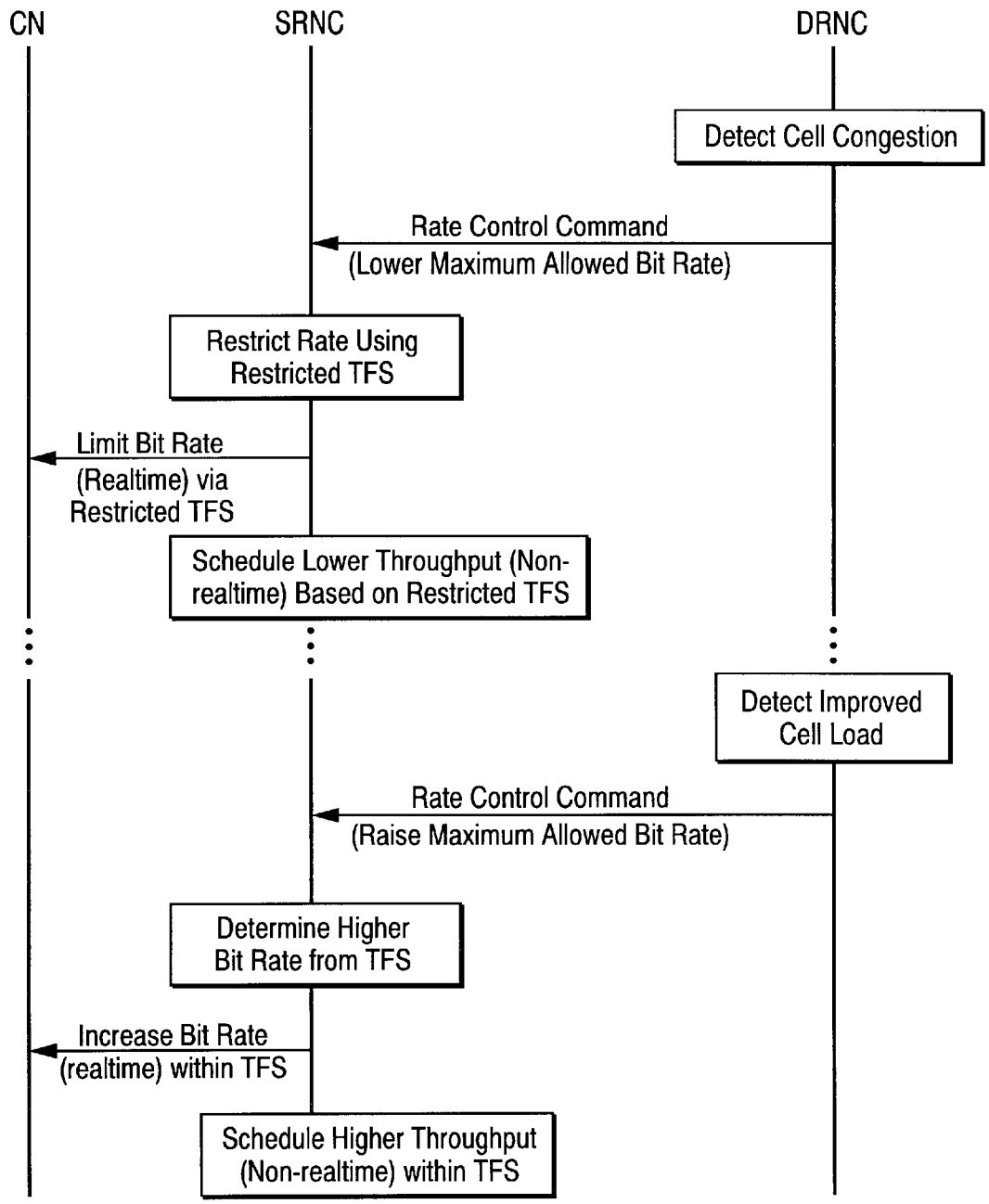

FIG. 7 shows a rate control flow diagram after the connection has been established through the drift RNC and the drift RNC base station to the user equipment. The drift RNC discovers an overload or congestion situation in the UE's cell, suggesting that the cell is close to or approaching its capacity limit. In response, the drift RNC sends a rate control command to the serving RNC to lower the maximum allowed bit rate. This is accomplished, for example, by forbidding certain transport formats in the transport format set from being employed. However, the drift RNC cannot limit the transport format below the guaranteed rate.

The serving RNC limits the maximum allowed bit rate using the restricted transport format set. For real time connections, this restriction is implemented by sending a limit bit rate message to the core network instructing the core network to lower the bit rate in which it is delivering information corresponding this connection to the radio access network to a lower permitted bit rate value. For non-real time type services, the serving RNC schedules a lower throughput so that data is not sent at a rate greater than what is permitted by the restricted transport format set. The serving RNC limits the bit rate by buffering data received from the core network.

The situation may occur where the UE connection is in a soft handover and is supported by two drift RNCs which are coupled to the serving RNC. Both of the drift RNCs may send to the serving RNC a rate control command to lower the transmission rate to the UE back to the serving RNC. Since the same information, i.e., the same transport format, should be transmitted from all cells in soft handover, the serving RNC cannot use a transport format with a higher bit rate than allowed by all connected drift RNCs and allowed by the cells associated with the serving RNC. The serving RNC therefore determines which of the restricted rates is the lowest and limits the transmission rate of both drift RNCs to that lowest bit rate.

If the drift RNC detects an improvement in the cell congestion or load situation, it may detect that there are additional resources available that would permit a higher maximum allowed bit rate. Accordingly, the drift RNC may send an increase maximum allowed bit rate control command to the serving RNC which then determines from the transport format set a higher permissible bit rate. For real time services, the serving RNC sends that higher bit rate to the core network so that it may receive data at a higher rate. For non-real time services, the serving RNC may schedule a higher throughput for the data that is to be communicated to the UE.

As described above, the rate control command (RCC) message, sent from the drift RNC to the serving RNC, requests a decrease (or an increase) in the amount of radio or other resources in response to a current load or congestion condition in a drift RNC cell. The RCC message may indicate one or more specific dedicated transport channels whose rate is to be decreased, e.g., the transport channel(s) allocated to a UE connection. Alternatively, a general rate decrease command may be sent by the drift RNC, and the serving RNC is left to determine which connections(s) or transport channel(s) will have a rate reduction. While the decreased resource usage may be indicated by a restricted transport format set, if more than one dedicated transport channel is effected, maximum allowed bit rates may be communicated using a transport format combination set (TSCS) of bit rates that are simultaneously supported by those plural dedicated transport channels.

The rate control command may be implemented by defining a new protocol by defining a new message in existing signaling protocols. For example, this information may be incorporated in a message that currently exists in the 3GPP specification for the radio access network signaling protocols. Alternatively, a new piece of control information could be defined within the user plane frame handling protocols of 3GPP. In a particular example, the 3GPP Radio Link Preemption Required Indication message can be sent by the drift RNC to the serving RNC when congestion is detected by the RNC indicating that the user data rate should be reduced. The serving RNC can then respond, as shown above, by limiting the bit rate us ing core network rate control or by limiting the scheduled bit rate. A more permanent action by the SRNC could include initiation of a radio link configuration procedure, reducing the set of transport formats configured for the DCH(s). This action has the advantage of making available more resources in the drift RNC cell, such as spreading codes, but it has the disadvantage of more signaling, and therefore, should not be executed too often.

Figure 8:
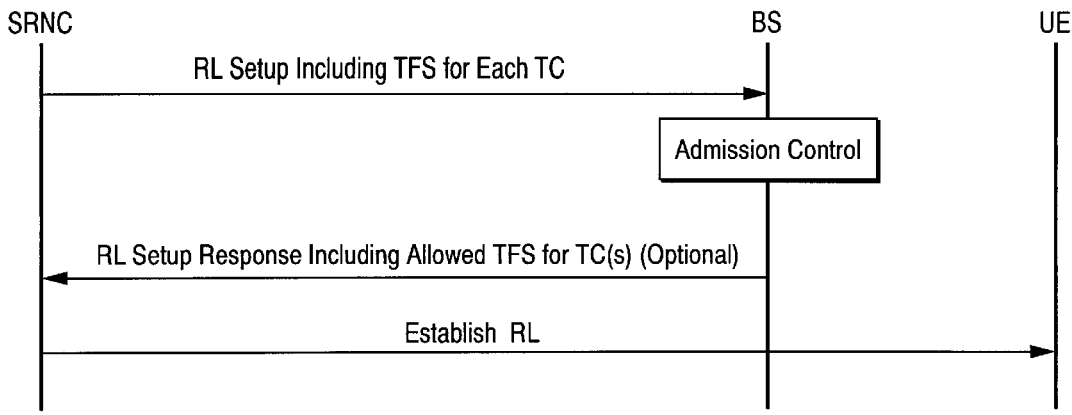
FIGS. 8 and 9 show signaling phase and rate control phase flow diagrams for an example application of the present invention that incorporates the base station in the RAN rate control.
Figure 9:
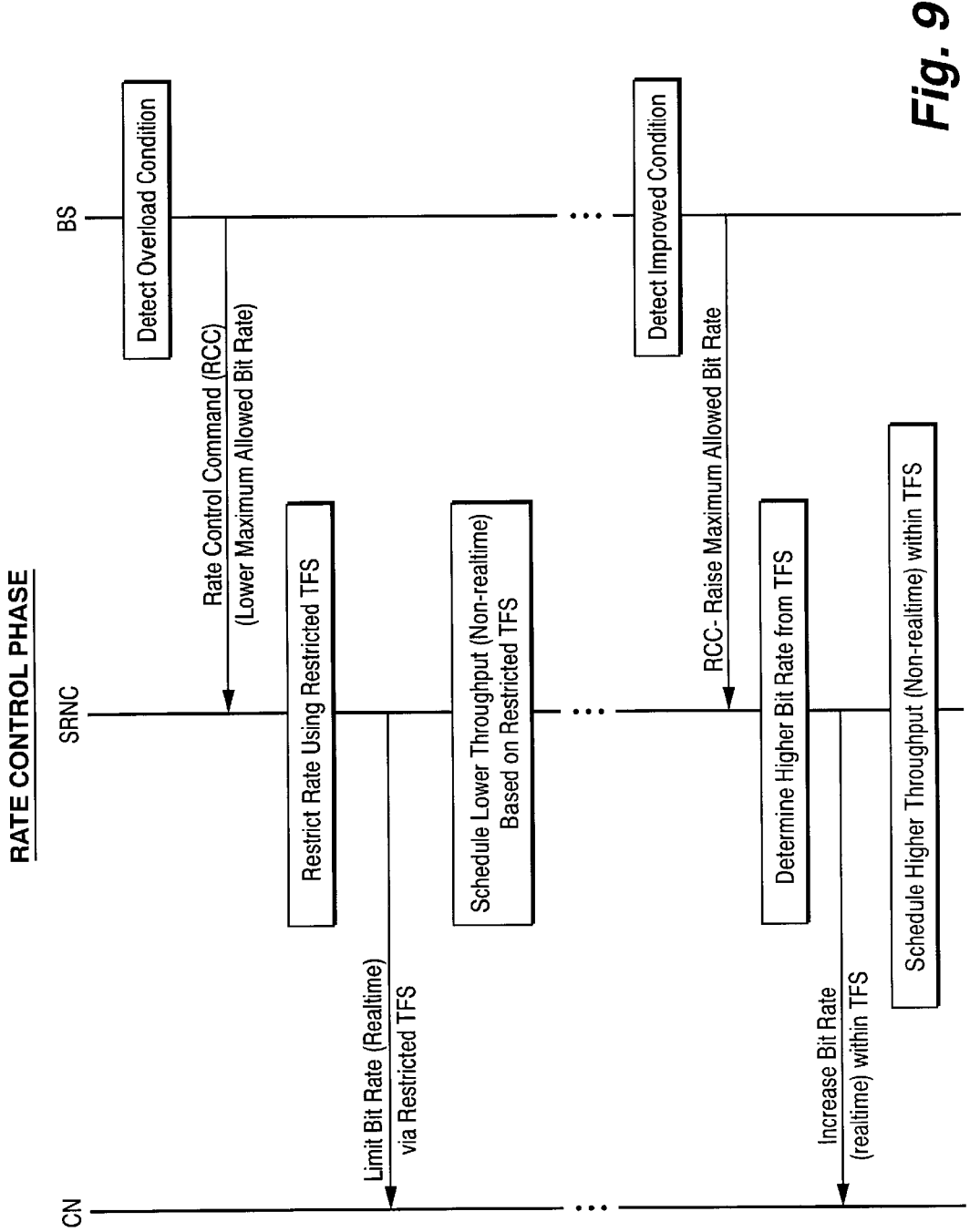

Similar signaling diagrams for a signaling phase and a rate control phase flow diagrams, where the invention is applied to a connection directly between a serving RNC and the radio base station, (or indirectly via a drift RNC) are illustrated in FIGS. 8 and 9. Similar messages and procedures described in conjunction with FIGS. 6 and 7 also apply to the base station. In FIG. 8, the permitted transport format set for each transport channel is not only communicated to the drift RNC, but also to the radio base station. In response, the base station performs appropriate admission control operations so that it can support at least the guaranteed bit rate based on base station resources. The serving RNC establishes the radio link with the UE at the end of the signaling phase. In FIG. 9, which shows a rate control phase, the base station may detect an overload condition and request a lower maximum allowed bit rate from the serving RNC (or a drift RNC if the base station is connected via the drift RNC). The base station may also detect an improved condition prompting an increase rate control command. The load condition may be based on uplink interference and/or on limitations of power available from power amplifier equipment in the base station. Again, as an alternative to rate control signals from the radio base station on a per transport channel or per connection basis, the radio base station may simply provide an overall load indication to its drift RNC. It is the drift RNC that detects an overload situation and provides a rate control command according to the present invention to the SRNC.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Accordingly, it is intended that the invention be limited only by the scope of the claims appended hereto.

What is claimed is:

1. A method, comprising:

establishing a connection between an external network to a user equipment unit over a radio interface via a radio access network (RAN) including a first RAN node and a second RAN node;

regulating the transmission rate of information between the first RAN node to the second RAN node based on a rate control request from the second RAN;

associated with establishment of the connection, the first RAN node requests a guaranteed bit rate from the second RAN node to be supported by the second RAN node for the connection, and the second RAN node performs an admission control operation for the connection taking into account the guaranteed bit rate and reserving resources for the guaranteed bit rate, wherein the guaranteed bit rate is a minimum bit rate lower than a maximum bit rate permitted for the connection, and wherein the second RAN node does not request a change in bit rate lower than the guaranteed bit rate.

2. A method, comprising:

establishing a connection between an external network to a user equipment unit over a radio interface via a radio access network (RAN) including a radio network controller node and a radio base station node, and regulating the transmission rate of information between the radio network controller node to the radio base station node based on a rate control request from the radio base station nodes, wherein when a load condition is detected by the radio base station node, the radio base node requests the radio network controller node to lower the transmission rate of information and the radio network controller node lowers the transmission rate of information.

3. The method in claim 2, wherein the transmission rate of information is regulated in a downlink direction from the radio network controller node to the radio base station node.

4. The method in claim 2, wherein the transmission rate of information is regulated in an uplink direction from the radio base station node to the radio network controller node.

5. The method in claim 2, further comprising:

permitting an increase of the transmission rate of information when the load condition is relieved.

6. The method in claim 1, wherein the first RAN node and second RAN node correspond to a serving radio network controller and a drift radio network controller, respectively.

7. In a mobile radio communications system including a core network, a radio access network with a serving radio network controller (SRNC) coupled to an SRNC radio base station and a drift radio network controller (DRNC) coupled to a DRNC radio base station, and a user equipment unit capable of communicating with one or more base stations over a radio interface, a method comprising:

establishing connection to the user equipment unit via the SRNC, the DRNC, and the DRNC base station;

the SRNC sends a set of transport formats to be supported by the DRNC for the connection, wherein the set of transport formats includes a minimum bit rate and one or more higher bit rates; and the DRNC performs an admission control operation for the connection and reserves resources to support the minimum bit rate;

monitoring a condition in a cell corresponding to the DRNC base station;

based on the condition in the cell, making a first request that the SRNC change a bit rate the SRNC is allowed to use; and the SRNC changes the bit rate for the connection in response to the first request, wherein when a congestion condition is detected in the cell, the DRNC sends a message to the SRNC restricting which one or ones of the transport formats from the transport format set may be employed.

8. The method in claim 7, further comprising:
a changed condition is detected in the cell, making an additional request that the SRNC change the bit rate the SRNC is allowed to use in accordance with the changed condition; and
changing the bit rate for the connection in response to the additional DRNC request.

9. The method in claim 7,
wherein the set of transport formats includes a guaranteed bit rate from the DRNC to be supported by the DRNC for the connection, and
the DRNC performs the admission control operation for the connection taking into account the guaranteed bit rate.

10. The method in claim 9, wherein the guaranteed bit rate is a minimum bit rate lower than a maximum bit rate permitted for the connection.

11. The method in claim 10, wherein the DRNC is not permitted to request a change in bit rate lower than the guaranteed bit rate.

12. For use in a mobile radio communications system including a core network, a radio access network with a serving radio network controller (SRNC) coupled to an SRNC radio base station and a drift radio network controller (DRNC) coupled to a DRNC radio base station, and a user equipment unit capable of communicating with one or more base stations over a radio interface, a method comprising:
establishing connection to the user equipment unit via the SRNC, the DRNC, and the DRNC base station;
monitoring a condition in a cell corresponding to the DRNC base station;
based on the condition in the cell, making a first request that the SRNC change a bit rate the SRNC is allowed to use; and
the SRNC changes the bit rate for the connection in response to the first request,
wherein the connection is mapped to one or more dedicated transport channels, the SRNC sends to the DRNC a set of transport formats for each transport channel, and the first request limits which ones of the transport formats are allowed to be used for the one or more transport channels.

13. The method in claim 12, wherein if the connection is in soft handover between two cells, the SRNC limits the bit rate for the connection in both cells to the lower of the bit rates permitted in the two cells.

14. The method in claim 12, wherein the condition is a load or congestion condition in the cell based on measured interference or transmission power.

15. In a mobile radio communications system including a core network, a radio access network with a serving radio network controller (SRNC) coupled to an SRNC radio base station and a drift radio network controller (DRNC) coupled to a DRNC radio base station, and a user equipment unit capable of communicating with one or more base stations over a radio interface, a method comprising:
establishing connection to the user equipment unit via the SRNC, the DRNC, and the DRNC base station;
monitoring a condition in a cell corresponding to the DRNC base station;
based on the condition in the cell, making a first request that the SRNC change a bit rate the SRNC is allowed to use; and
the SRNC changes the bit rate for the connection in response to the first request,
wherein the connection is mapped to one or more dedicated channels, and the SRNC determines how to respond to the request based one or more attributes associated with the transport channels.

16. The method in claim 15, wherein for a real time type of service, the SRNC initiates a rate control procedure with the core network to limit the rate at which information associated with the connection is provided to the radio access network.

17. The method in claim 15, wherein for a non-real time type of service, the SRNC schedules delivery of information associated with the connection over the transport channel in accordance with a change in a maximum allowed bit rate.

18. Apparatus for use in a radio access network, comprising:
a first RAN node configured to establish a connection between an external network and a user equipment unit over a radio interface via radio access network (RAN), where the connection is supported by the first RAN node and a second RAN node, and
the second RAN node configured to regulate a transmission rate of information associated with the user equipment unit from the first RAN node to the second RAN node based on a rate control request from the second RAN node,
wherein the first RAN node is configured to request a guaranteed bit rate from the second RAN node to be supported by the second RAN node for the connection, and the second RAN node is configured to perform an admission control operation for the connection taking into account the guaranteed bit rate,
wherein the guaranteed bit rate is a minimum bit rate lower than a maximum bit rate permitted for the connection, and
wherein the second RAN node is configured to not request a change in bit rate lower than the guaranteed bit rate.

19. The apparatus in claim 18, wherein the rate control request is made based on a congestion condition being monitored by the second RAN node.

20. The apparatus in claim 19, wherein the second RAN node is configured to detect the congestion condition and lower the transmission rate of information.

21. The apparatus in claim 20, wherein an increase of the transmission rate of information is permitted by the second RAN node when the congestion condition is relieved.

22. The apparatus in claim 18, wherein the first RAN node and second RAN node correspond to a serving radio network controller and a drift radio network controller, respectively.

23. The apparatus in claim 18, wherein the transmission rate is regulated in a downlink direction from the radio network controller node to the radio base station node.

24. The apparatus in claim 18, wherein the transmission rate is regulated in an uplink direction from the radio base station node to the radio network controller node.

25. Apparatus for use in a radio access network, comprising
a radio network controller node configured to establish a connection between an external network and a user equipment unit over a radio interface via radio access network (RAN), where the connection is supported by the radio network controller node and a radio base station node, and
the radio base station node configured to regulate a transmission rate of information associated with the user equipment unit from the radio network controller node to the radio base station node based on a rate control request from the radio base station node, wherein when a load condition is detected by the radio base station node, the radio base station node is configured to request the radio network controller node to lower the transmission rate of information, and in response, the radio network controller node is configured to lower the transmission rate of information.

26. A radio access network (RAN) configured to provide radio access bearer services between a core network and wireless user equipment units (UEs) over a radio interface, comprising:

a serving radio network controller (SRNC) coupled to an SRNC radio base station having a first cell area;

a drift radio network controller (DRNC) coupled to a DRNC radio base station having a second cell area, where when the core network requests a connection to a user equipment unit, a connection is established through the SRNC and SRNC base station over the radio interface to the user equipment unit in the first cell area, and when the connection is handed over to the second cell area, the connection is established to the user equipment unit by way of the SRNC, the DRNC, and the DRNC base station;

the DRNC being configured to monitor a condition in the second cell area corresponding the DRNC base station, and based on the condition in the second cell area, to make a first request that the SRNC change a bit rate at which the SRNC is permitted to send information from the core network to the DRNC for the connection; and the SRNC being configured to change the bit rate for the connection in response to the first request, wherein the connection is mapped to one or more dedicated transport channels, the SRNC is configured to send to the DRNC a set of transport formats for each transport channel, and the first request limits which ones of the transport formats are allowed to be used for the one or more transport channels.

27. The RAN in claim 26, wherein if the DRNC detects a changed condition in the cell, the DRNC is configured to make a second request that the SRNC change the bit rate the SRNC is allowed to use in accordance with the changed condition, and in response to the second request, the SRNC is configured to change the bit rate for the connection.

28. The RAN in claim 26, wherein the SRNC is configured to request a guaranteed bit rate from the DRNC to be supported by the DRNC for the connection, the set of transport formats including a minimum bit rate and one or more higher bit rates, and wherein the DRNC is configured to perform an admission control operation for the connection taking into account the guaranteed bit rate.

29. The RAN in claim 28, wherein the guaranteed bit rate is a minimum bit rate lower than a maximum bit rate permitted for the connection.

30. The RAN in claim 29, wherein the DRNC is not permitted to request a change in bit rate lower than the guaranteed bit rate.

31. The RAN in claim 26, wherein the SRNC performs a radio link reconfiguration to release not allowed transport formats from the one or more dedicated transports channels.

32. The RAN in claim 26, wherein if the connection is in soft handover between two cells, the SRNC limits the bit rate for the connection in both cells to the lower of the bit rates permitted in the two cells.

33. The RAN in claims 26, wherein the condition is a load or congestion condition in the cell as measured by interference or power levels.

34. A radio access network (RAN) configured to provide radio access bearer services between a core network and wireless user equipment units (UEs) over a radio interface, comprising:

a serving radio network controller (SRNC) coupled to an SRNC radio base station having a first cell area;

a drift radio network controller (DRNC) coupled to a DRNC radio base station having a second cell area, where when the core network requests a connection to a user equipment unit, a connection is established through the SRNC and SRNC base station over the radio interface to the user equipment unit in the first cell area, and when the connection is handed over to the second cell area, the connection is established to the user equipment unit by way of the SRNC, the DRNC, and the DRNC base station;

the DRNC being configured to monitor a condition in the second cell area corresponding the DRNC base station, and based on the condition in the second cell area, to make a first request that the SRNC change a bit rate at which the SRNC is permitted to send information from the core network to the DRNC for the connection; and the SRNC being configured to change the bit rate for the connection in response to the first request, wherein the connection is mapped to one or more transport channels, and the SRNC determines how to respond to the first request based one or more attributes associated with the transport channels.

35. The RAN in claim 34, wherein for a real time type of service, the SRNC is configured to initiate a rate control procedure with the core network to limit the rate at which information associated with the connection is provided to the radio access network over the transport channel.

36. The RAN in claim 35, wherein for a non-real time type of service, the SRNC is configured to schedule delivery of information associated with the connection over the transport channel in accordance with the change in bit rate.

* * * * *